United States Patent
Hu et al.

(10) Patent No.: US 9,819,405 B2
(45) Date of Patent: Nov. 14, 2017

(54) SYSTEMS AND METHODS FOR TRANSMISSION PAIRING MIXED TRANSMISSION MODES

(71) Applicants: Hao Hu, Ottawa (CA); Ming Jia, Ottawa (CA); Jianglei Ma, Ottawa (CA)

(72) Inventors: Hao Hu, Ottawa (CA); Ming Jia, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 14/738,144

(22) Filed: Jun. 12, 2015

(65) Prior Publication Data

US 2016/0365905 A1    Dec. 15, 2016

(51) Int. Cl.
| | |
|---|---|
| H04B 10/2569 | (2013.01) |
| H04B 7/0456 | (2017.01) |
| H04B 7/04 | (2017.01) |
| H04L 25/497 | (2006.01) |
| H04L 27/34 | (2006.01) |
| H04W 88/02 | (2009.01) |
| H04W 88/08 | (2009.01) |

(52) U.S. Cl.
CPC ......... *H04B 7/0456* (2013.01); *H04B 7/0482* (2013.01); *H04L 25/497* (2013.01); *H04L 27/3488* (2013.01); *H04L 27/3494* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2008/0031369 A1* | 2/2008 | Li | .......................... | H04L 1/0618 375/260 |
| 2010/0008679 A1* | 1/2010 | Cole | ...................... | H04B 10/40 398/185 |
| 2012/0307706 A1* | 12/2012 | Nakano | ................ | H04J 11/0033 370/312 |

(Continued)

FOREIGN PATENT DOCUMENTS

| | | |
|---|---|---|
| CN | 101444060 | 5/2009 |
| CN | 101682497 | 3/2010 |

OTHER PUBLICATIONS

Y. Saito, Y. Kishiyama, A. Benjebbour, T. Nakamura, A. Li, K. Higuchi, "Non-Orthogonal Multiple Access (NOMA) for Future Radio Access", VTC Spring 2013, Jun. 2-5, 2013.

(Continued)

*Primary Examiner* — Brandon Renner

(57) ABSTRACT

Methods and systems for transmitting a signal. A first signal from a first device operating in spatial multiplexing transmission is concatenated with a second signal from a second device operating without spatial multiplexing transmission to generate a concatenated signal in a non-linearly superpositioned constellation, in which a portion of the constellation corresponding to the first signal is symmetrical about each of the real and imaginary axes. The concatenated signal is processed according to transmission processing of the second device, to generate a processed signal. The processed signal is transmitted.

22 Claims, 11 Drawing Sheets

(56) References Cited

U.S. PATENT DOCUMENTS

| | | | | |
|---|---|---|---|---|
| 2013/0070874 | A1* | 3/2013 | Nakagawa | H04B 7/10 375/323 |
| 2014/0161439 | A1* | 6/2014 | Nolan | H04B 10/2581 398/16 |
| 2014/0293874 | A1* | 10/2014 | Oh | H04B 7/024 370/328 |
| 2015/0098440 | A1* | 4/2015 | Yang | H04J 11/0056 370/330 |
| 2015/0215016 | A1* | 7/2015 | Hunukumbure | 370/280 |
| 2015/0312958 | A1* | 10/2015 | Cheng | H04B 7/0413 370/252 |

OTHER PUBLICATIONS

International Search Report, PCT/CN2016/084998, dated Aug. 19, 2016.

Huawei, Hisilicon; Motivation for a study on enhancements for multiuser transmission in R13; 3GPP TSG RAN, RP-141917, Dec. 11, 2014.

Majid Nasiri Khormuji; Generalized Semi-Orthogonal Multiple-Access for Massive MIMO; IEEE 81st Vehicular Technology Conference, May 14, 2015.

Huawei, Hisilicon; Candidate schemes for superposition transmission; 3GPP TSG RAN WGI #80b; R1-151848 24, Apr. 24, 2015.

* cited by examiner

| | SC k | SC k+1 |
|---|---|---|
| Tx (h) | $s_{lsu,k}$ | $s_{lsu,k+1}$ |
| Tx (v) | $-s^*_{lsu,k+1}$ | $s^*_{lsu,k}$ |

FIG. 5

| | SC k | SC k+1 |
|---|---|---|
| Tx (h) | $\hat{s}_{k,h}$ | $\hat{s}_{k+1,h}$ |
| Tx (v) | $-\hat{s}_{k,v}^*$ | $\hat{s}_{k+1,v}^*$ |

FIG. 6

SYSTEMS AND METHODS FOR TRANSMISSION PAIRING MIXED TRANSMISSION MODES

FIELD

The present disclosure relates to digital communications, in particular for transmission of signals using a spatial multiplexing device paired with a non-spatial multiplexing device.

BACKGROUND

Semi-orthogonal multiple access (SOMA) is a candidate technique for transmission of signals that is being considered by the Third Generation Partnership Project (3GPP). A discussion of SOMA is provided in U.S. patent application Ser. No. 14/589,676, filed Jan. 5, 2015, titled "SYSTEM AND METHOD FOR SEMI-ORTHOGONAL MULTIPLE ACCESS", the entirety of which is hereby incorporated by reference.

SOMA is based on non-linear superposition coding of transmission signals from paired user equipment (UEs). This typically requires that the paired UEs share the same constellation domain. Thus, there is a challenge in pairing UEs operating in different transmission modes, such as UEs that use spatial multiplexing (e.g., UEs operating in transmission mode 3 (TM3)) and UEs that do not (e.g., UEs operating in transmission mode 2 (TM2)), which do not share the same constellation domain.

SUMMARY

In some examples, the present disclosure provides a method for transmitting a signal. The method includes: concatenating a first signal from a first device operating in spatial multiplexing transmission with a second signal from a second device operating without spatial multiplexing transmission to generate a concatenated signal in a non-linearly superpositioned constellation, in which a portion of the constellation corresponding to the first signal is symmetrical about each of the real and imaginary axes; processing the concatenated signal according to transmission processing of the second device, to generate a processed signal; and transmitting the processed signal.

In some examples, the method may further include: prior to concatenating, applying an inverse of a transmission processing matrix to the first signal to generate an intermediate signal, the transmission processing matrix representing transmission processing of the first device; and processing the intermediate signal according to the transmission processing matrix to recover the first signal.

In some examples, the present disclosure provides a base station for transmitting a first signal from a first device operating in spatial multiplexing transmission paired with a second signal from a second device operating without spatial multiplexing transmission. The base station includes: a processor configured to execute instructions that cause the base station to: concatenate the first signal with the second signal from the second device to generate a concatenated signal in a non-linearly superpositioned constellation, in which a portion of the constellation corresponding to the first signal is symmetrical about each of the real and imaginary axes; and process the concatenated signal according to transmission processing of the second device, to generate a processed signal. The base station also includes a transmitter coupled to the processor, the transmitter being configured to transmit the processed signal.

In some examples, the processor of the base station may be configured to execute instructions that may further cause the base station to: prior to concatenating, apply an inverse of a transmission processing matrix to the first signal to generate an intermediate signal, the transmission processing matrix representing transmission processing of the first device; and process the intermediate signal according to the transmission processing matrix to recover the first signal.

In some examples, the present disclosure provides a method for receiving a signal. The method includes: receiving a signal encoded in a non-linearly superpositioned constellation, the signal having been encoded from a concatenated signal comprising a first signal that is spatial multiplexed and a second signal that is not spatial multiplexed, in which a portion of the constellation corresponding to the first signal is symmetrical about each of the real and imaginary axes; and decoding the signal according to the non-linearly superpositioned constellation to produce the first signal.

In some examples, the present disclosure provides a device operating in spatial multiplexing transmission. The device includes: a processor configured to execute instructions to cause the device to: receive a signal encoded in a non-linearly superpositioned constellation, the signal having been encoded from a concatenated signal comprising a first signal that is spatial multiplexed and a second signal that is not spatial multiplexed, in which a portion of the constellation corresponding to the first signal is symmetrical about each of the real and imaginary axes; and decode the signal according to the non-linearly superpositioned constellation to produce the first signal.

BRIEF DESCRIPTION OF THE DRAWINGS

Reference will now be made, by way of example, to the accompanying drawings which show example embodiments of the present application, and in which:

FIG. 5 is a table representing coding used by TM2, in accordance with a disclosed example;

FIG. 6 is a table representing TM2 coding applied to a non-linearly superpositioned constellation, in accordance with a disclosed example;

Similar reference numerals may have been used in different figures to denote similar components.

DESCRIPTION OF EXAMPLE EMBODIMENTS

The present disclosure provides examples in the context of communications systems that use advanced multiple access techniques. The present disclosure may apply to standards compliant communications systems, including those that are compliant with 3GPP, IEEE 802.11 and other technical standards. The present disclosure may also apply to non-standards compliant communications systems, in some examples.

SOMA is a proposed technique for signal transmission that is being considered in 3GPP. SOMA aims to improve transmission efficiency by superpositioning multiple users in the power domain. SOMA can work with closed-loop (CL) single-user multiple-input and multiple-output (SU-MIMO) systems. In CL SU-MIMO, a high signal-to-noise ratio UE (HSU) operates in 2-layer SU-MIMO mode, using transmission mode 4 (TM4); a low signal-to-noise ratio UE (LSU) operates in 1-layer SU-MIMO modes, also using TM4. When the LSU shares the same precoder as one of the precoders in the 2-layer SU-MIMO mode (which is used by the HSU), applying SOMA to the UE pair on the shared precoder is straightforward.

However, a challenge arises in open-loop (OL) SU-MIMO. In this case, 1-layer transmission, which is used by the LSU, is supported by TM2; however 2-layer transmission, which is used by the HSU, is supported by TM3. SOMA is based on non-linear superposition coding of transmission signals from paired UEs, and requires the paired UEs to share the same constellation domain in order to form a joint constellation. However, TM2 and TM3 constellations do not appear in the same constellation domain (i.e., the TM2 and TM3 constellations do not go through the same transforming and coding process). Thus, pairing TM2 and TM3 UEs for SOMA presents a challenge. Since the LSU operates in 1-layer mode and TM3 does not have a 1-layer mode, the present disclosure provides example techniques for enabling the paired LSU and HSU to share the constellation domain of TM2.

Although the present disclosure provides examples and discussion in the context of pairing TM2 and TM3 UEs for SOMA, some examples of the present disclosure may generally be applicable to pairing of a device using spatial multiplexing transmission with a device not using spatial multiplexing transmission, for non-linear superposition coding (e.g., to generate a symmetrical constellation such as in SOMA).

Figure 1:
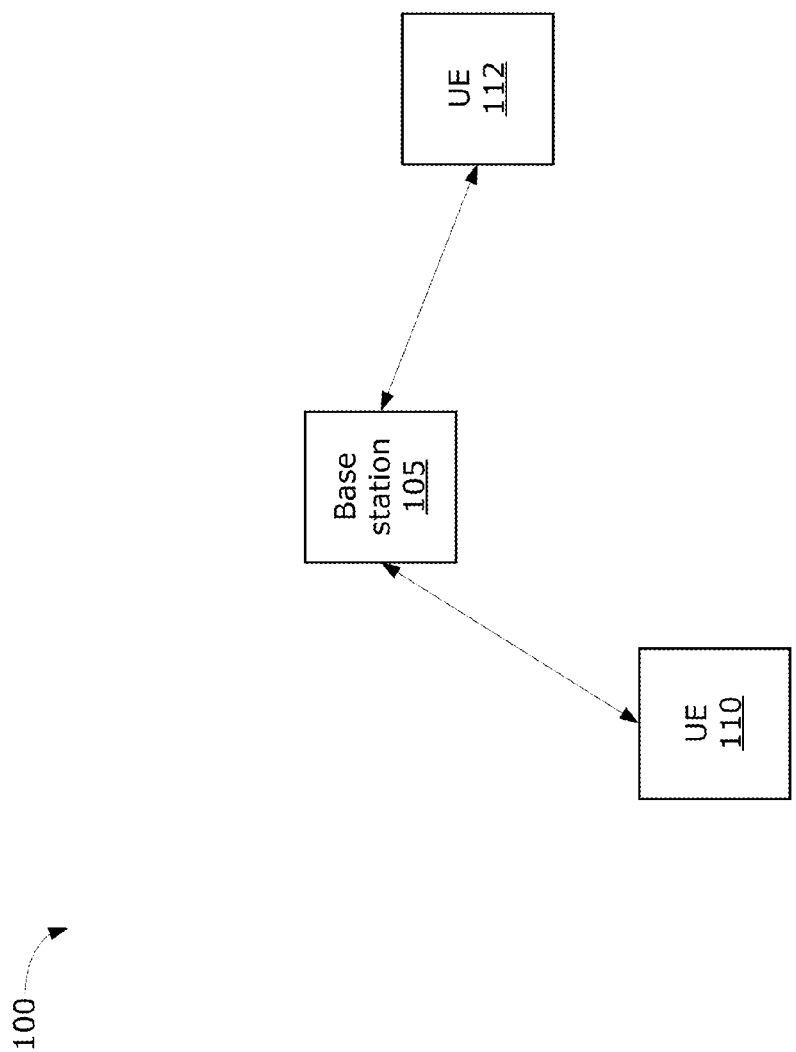
FIG. 1 is a schematic diagram of an example communications system, in accordance with a disclosed example.

FIG. 1 is a schematic diagram of an example communications system 100, in which examples of the present disclosure may be implemented. The communications system 100 may include a base station 105, which may be an evolved Node B (eNB) in the Long-Term Evolution (LTE) standard. The base station 105 may serve a plurality of UEs 110, 112. The UEs 110, 112 may receive communications from and transmit communications to the base station 105. The base station 105 may also be referred to as a Node B, controller, base terminal station or access point, for example. The UEs 110, 112 may include any client devices, and may also be referred to as mobile stations, mobile terminals, user devices, client devices or subscriber devices, for example.

In the example of FIG. 1, the UE 110 is a device that does not use spatial multiplexing transmission, such as a LSU operating in one-layer TM2, while the UE 112 is a device that does use spatial multiplexing transmission, such as a HSU operating in two-layer TM3. The LSU 110 and the HSU 112 may be paired (e.g., as determined by the base station 105) for transmission using SOMA, in accordance with various examples of the present disclosure. The system 100 may include additional UEs (not shown), which may operate in TM2, TM3 and/or other transmission modes.

Figure 2:
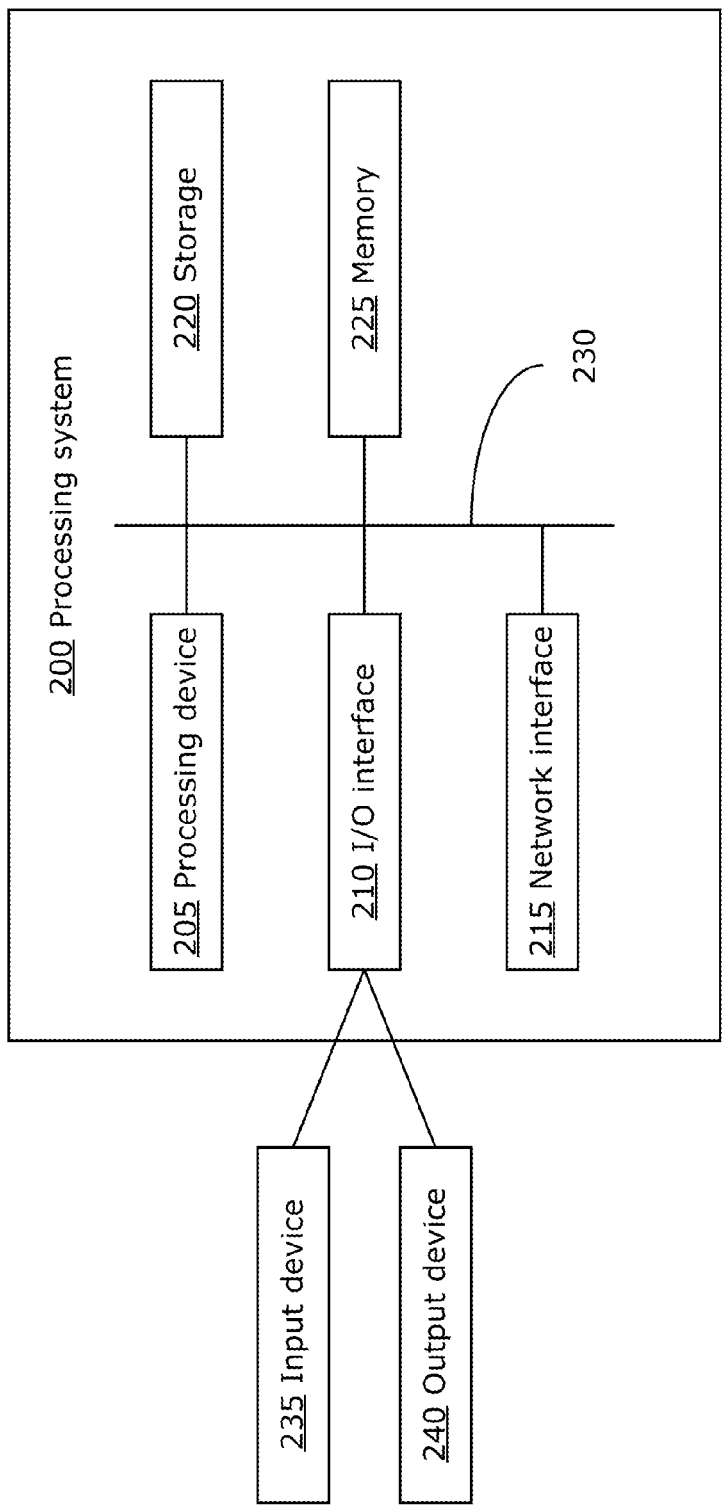
FIG. 2 is a schematic diagram of an example processing system suitable for implementing one or more disclosed examples.

FIG. 2 is a schematic diagram of an example processing system 200, which may be used to implement the methods and systems disclosed herein, such as the example base station 105 and UEs 110, 112, and the example methods described below. The processing system 200 may be a server or a mobile device, for example, or any suitable processing system. Other processing systems suitable for implementing the present disclosure may be used, which may include components different from those discussed below. Although FIG. 2 shows a single instance of each component, there may be multiple instances of each component in the processing system 200.

The processing system 200 includes one or more processing devices 205, such as a processor, a microprocessor, an application-specific integrated circuit (ASIC), a field-programmable gate array (FPGA), a dedicated logic circuitry, or combinations thereof. The processing system 200 may also include one or more input/output (I/O) interfaces 210, which may enable interfacing with one or more appropriate input devices 235 and/or output devices 240. The processing system 200 includes one or more network interfaces 215 for wired or wireless communication with a network (e.g., an intranet, the Internet, a P2P network, a WAN, a LAN, and/or a Radio Access Network (RAN)). The network interface(s) 215 may include wired links (e.g., Ethernet cable) and/or wireless links for intra-network and/or inter-network communications. The network interface(s) 215 may provide wireless communication via one or more transmitters or transmit antennas and one or more receivers or receive antennas, for example. The processing system 200 may also include one or more storage units 220, which may include a mass storage unit such as a solid state drive, a hard disk drive, a magnetic disk drive and/or an optical disk drive.

The processing system 200 may include one or more memories 225, which may include a volatile or non-volatile memory (e.g., a flash memory, a random access memory (RAM), and/or a read-only memory (ROM)). The non-transitory memory(ies) 225 may store instructions for execution by the processing device(s) 205, such as to carry out the present disclosure. The memory(ies) 225 may include other software instructions, such as for implementing an operating system and other applications/functions. In some examples, one or more data sets and/or module(s) may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 230 providing communication among components of the processing system 200, including the processing device(s) 205, I/O interface(s) 210, network interface(s) 215, storage unit(s) 220 and/or memory(ies)

225. The bus 230 may be any suitable bus architecture including, for example, a memory bus, a peripheral bus or a video bus.

In FIG. 2, the input device(s) 235 (e.g., a keyboard, a mouse, a microphone, a touchscreen, and/or a keypad) and output device(s) 240 (e.g., a display, a speaker and/or a printer) are shown as external to the processing system 200. In other examples, one or more of the input device(s) 235 and/or the output device(s) 240 may be included as a component of the processing system 200.

Figure 3:
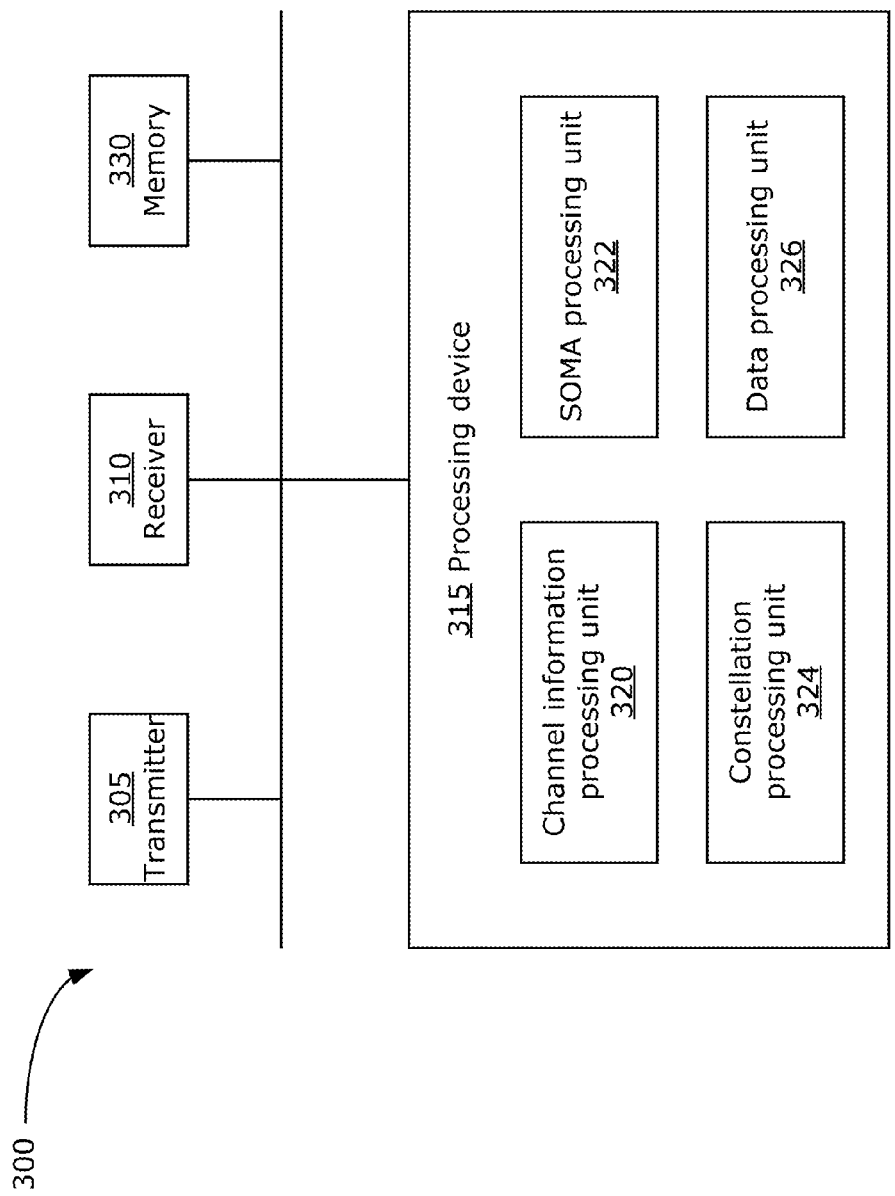
FIG. 3 is a schematic diagram of an example communications device operating as a base station, in accordance with a disclosed example.

FIG. 3 is a schematic diagram of an example communications device 300, which may be operating as the base station 105. The example communications device 300 may be used to implement various examples of the present disclosure. The communications device 300 may include a transmitter 305 configured to transmit packets, power allocation information, quadrature amplitude modulation (QAM) layer information, coding rate information, constellation map information, constellation map indicator, and QAM symbols, among other information. The communications device 300 may also include a receiver 310 configured to receive packets, channel information, and other information.

The communications device 300 may include a channel information processing unit 320, which may be configured to process channel information, for example channel state information and channel quality indicators, among others, to determine a measure of the quality of communications channels between the communications device 300 and UEs 110, 112. The communications device 300 may also include a SOMA processing unit 322 configured to utilize the measure of the quality of communications channels to determine power allocations, QAM layer assignments, coding rates, and constellation map assignments, for example. The communications device 300 may also include a constellation processing unit 324 configured to generate constellation maps with varying power offsets, and to generate a constellation map indicator for a constellation map assignment.

The communications device 300 may include a data processing unit 326 configured to decode and/or otherwise process received data. The data processing unit 326 may also be configured to encode data to be transmitted, in accordance with a constellation map assigned to an intended recipient of the data. The communications device 300 may also include one or more memories 330 for storing constellation maps (e.g., legacy and non-legacy constellation maps), channel information, power allocations, QAM layer assignments, coding rates, constellation map assignments, received data, data to be transmitted, and other such data. The channel information processing unit 320, SOMA processing unit 322, constellation processing unit 324 and data processing unit 326 may be implemented by one or more processing devices 315 of the communications device 300. In some examples, various elements of the communications device 300 may be implemented as hardware logic blocks and/or as software executing in a processor.

Figure 4:
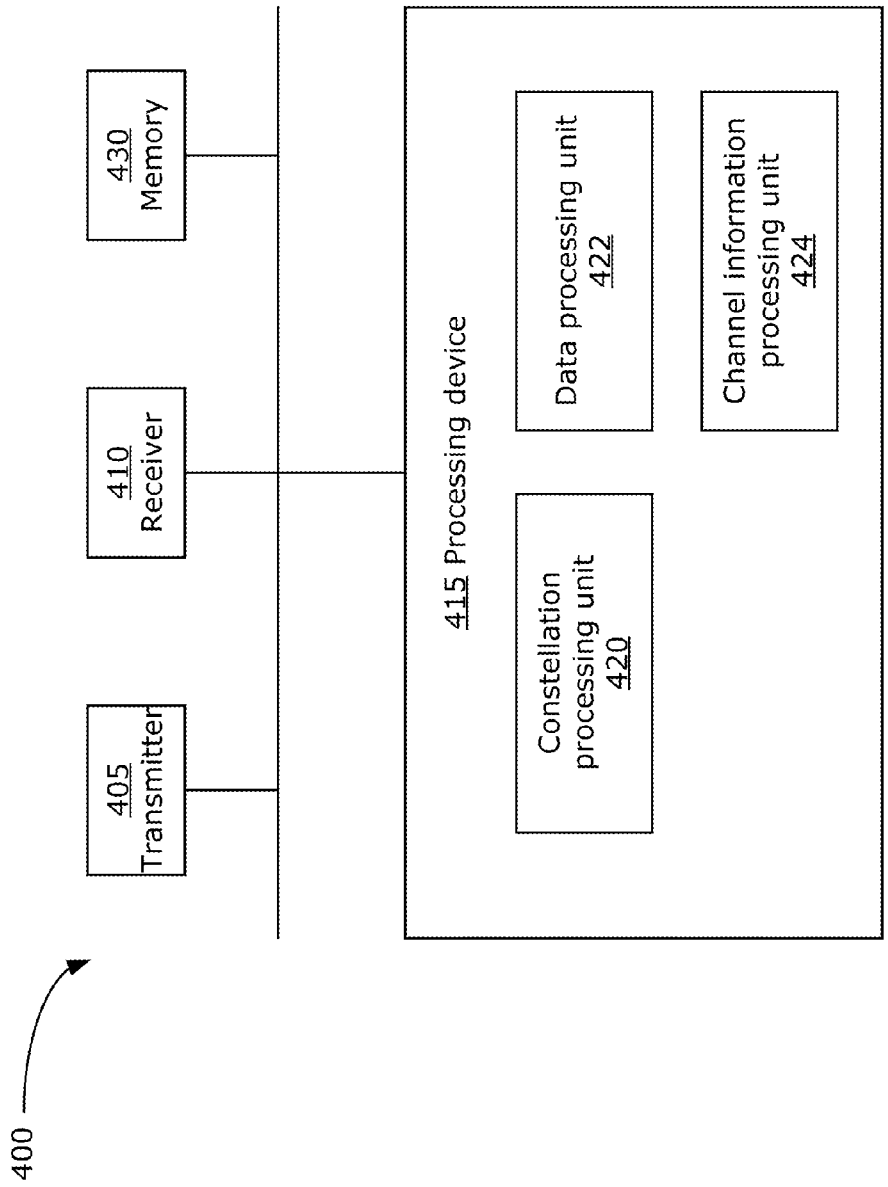
FIG. 4 is a schematic diagram of an example communications device operating as a UE, in accordance with a disclosed example.

FIG. 4 is a schematic diagram of an example communications device 400, which may be operating as a UE 110, 112. The example communications device 400 may be used to implement various examples of the present disclosure. The communications device 400 may include a transmitter 405 and a receiver 410. The transmitter 405 may be configured to transmit packets, channel information, QAM symbols, and other information. The receiver 410 may be configured to receive packets, power allocation information, QAM layer information, coding rate information, constellation map information, constellation map indicators, QAM symbols, and other information.

The communications device 400 may include a constellation processing unit 420, a data processing unit 422 and a channel information processing unit 424. The constellation processing unit 420 may be configured to process information, for example power allocation information, QAM layer information, coding rate information, constellation map information, and constellation map indicators, among others, to determine a constellation map for the communications device 400. For example, the constellation processing unit 420 may be configured to use a constellation map indicator to determine a constellation map assigned to the communications device 400. The constellation processing unit 420 may also be configured to use the constellation map to determine a power offset for the communications device 400, as well as a power allocation for the communications device 400.

The data processing unit 422 may be configured to encode data utilizing the constellation map assigned to the communications device 400. The data processing unit 422 may be configured to generate QAM symbols using the constellation map assigned to the communications device 400. The data processing unit 422 may also be configured to process received data. The channel information processing unit may be configured to make measurements of communications channels and to generate channel information, for example channel state information and channel quality indicators, to reflect the measurements. The constellation processing unit 420, data processing unit 422 and channel information processing unit 424 may be implemented in one or more processing devices 415 of the communications device 400.

The communications device 400 may include one or more memories 430 for storing information such as constellation maps (e.g., legacy and non-legacy constellation maps), channel information, power allocations, QAM layer assignments, coding rates, constellation map assignments, received data, data to be transmitted, and other data. In some examples, various elements of the communications device 400 may be implemented as hardware logic blocks and/or as software executing in a processor.

Both the communications device 300 and the communications device 400 may be implemented using the same configuration of or variants of the processing system 200 discussed above. The same or variants of the configuration of the communications device 400 may be used to implement the UE 110 operating in TM2 as well as the UE 112 operating in TM3.

Figure 5:
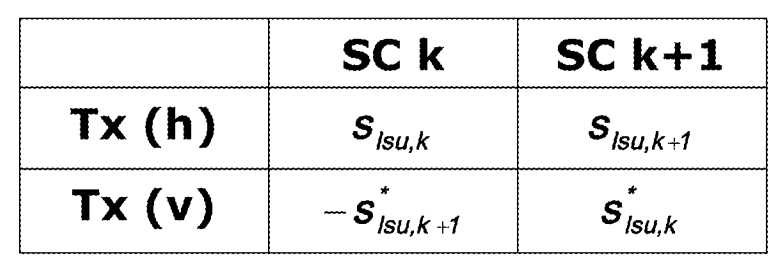

As discussed above, SOMA may be used for the pair of TM2 and TM3 UEs if both UEs share the TM2 constellation domain. FIG. 5 is a table showing an example of the signal coding used in TM2 operation. In this example, space-frequency block codes (SFBC) are shown. In FIG. 5, Tx(h) is the horizontal transmission antenna, Tx(v) is the vertical transmission antenna, SC is the source carrier, k is the carrier index, S is the transmitted signal, and * denotes the conjugate of the signal. In this SFBC example, only two signals are transmitted, namely $S_k$ and $S_{k+1}$. An example of a SFBC that may be used in TM2 is Alamouti code.

To perform SOMA, the both the signal from the LSU and the signal from the HSU need to be non-linearly superposition encoded, to generate the symmetrical SOMA constellation. Although generally referred to as a symmetrical constellation, more specifically it is the portion of the superpositioned constellation corresponding to the HSU signal that is symmetrical, as discussed further below. Typically, superposition encoding is performed after TM2 coding has been applied to the LSU signal. The result of this superpositioning may be represented by the following equations:

$$S_{k,h} = S_{lsu,k} \oplus S_{hsu,2k}$$

$$S_{k,v} = -S^*_{lsu,k+1} \oplus S_{hsu,2k+1}$$

$$S_{k+1,h} = S_{lsu,k+1} \oplus S_{hsu,2(k+1)}$$

$$S_{k+1,v} = S^*_{lsu,k} \oplus S_{hsu,2(k+1)+1}$$

where $\oplus$ indicates non-linear superpositioning of the constellations in order to achieve the SOMA constellation. However, such superpositioning of the HSU constellation on the coded LSU constellation is complicated to implement in the HSU, since it would be necessary for the superposition encoder to determine where the coded LSU signal constellation is located.

In an example of the present disclosure, rather than generating the non-linear superpositioned constellation from the coded signal, as is conventionally done when SOMA is applied to UE pairs using the same transmission mode, the SFBC coding, which is performed in accordance with TM2, may instead be performed after the non-linear superpositioning. This may be simpler to implement since modulation of the HSU signal would not need to be dependent on modulation of the LSU signal. However, since the TM2 coding is then applied to the non-linearly superpositioned constellation, this means that the HSU signal (which is part of the superpositioned constellation) will also undergo TM2 coding, which it normally would not be expected to undergo. However, a property of the superpositioned constellation is that the portion of the signal corresponding to the bits of the HSU signal are symmetrical across each of the real and imaginary axes in the resulting constellation. This is illustrated by the example constellation of FIG. 10.

Figure 10:
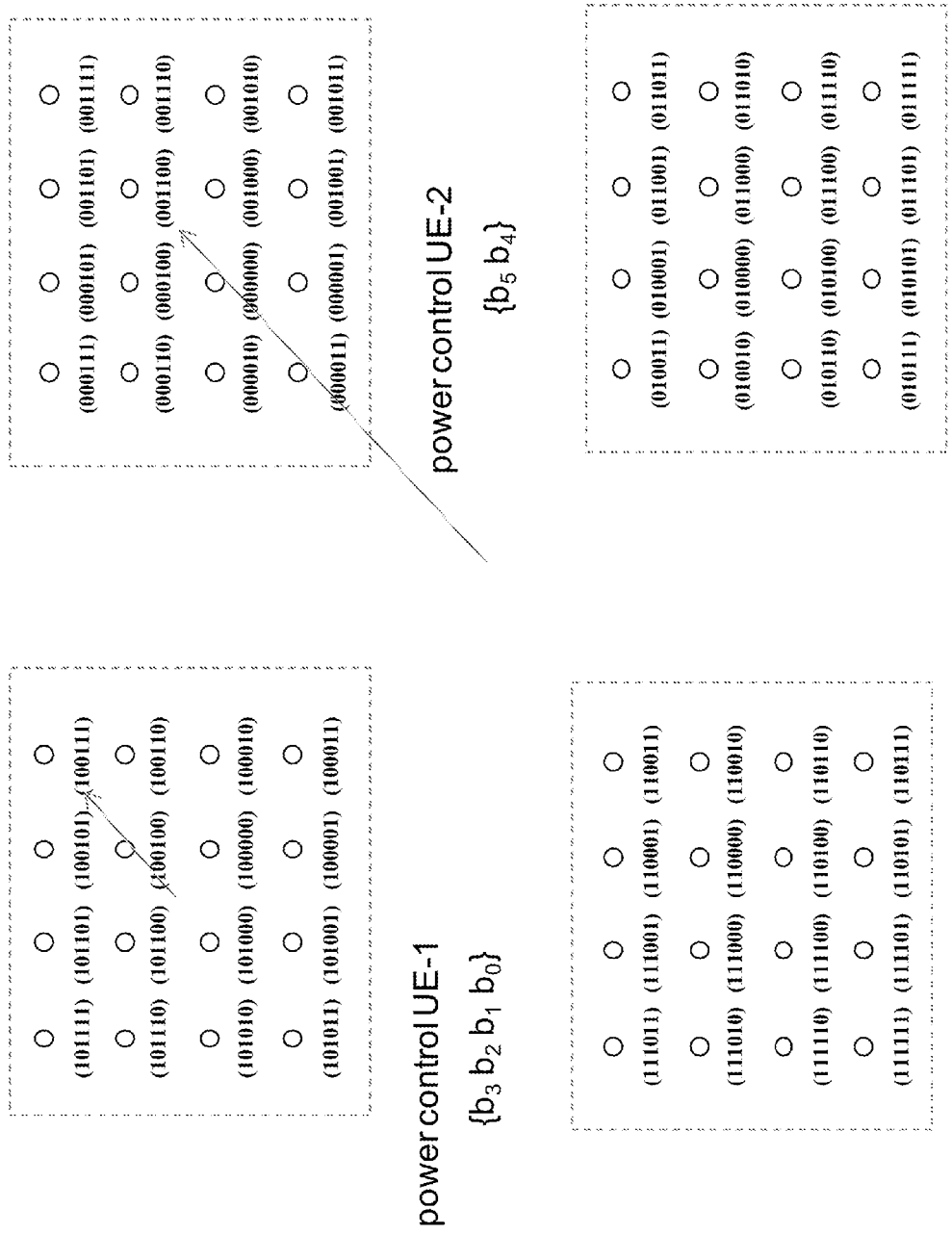
FIG. 10 illustrates an example SOMA constellation, in accordance with a disclosed example.

The example constellation of FIG. 10 is the result of non-linear superpositioning of the LSU and HSU constellations. In this example, UE-1 is the HSU and UE-2 is the LSU. Bits b0, b1, b2 and b3 are allocated to UE-1 while bits b4 and b5 are allocated to UE-2. As shown in FIG. 10, the bits allocated to UE-1 are symmetrical across each of the real and imaginary axes of the constellation. This means that applying the SFBC coding operation to the superpositioned constellation, which involves flipping over the real and imaginary axes, does not affect the portion of the superpositioned constellation corresponding to the HSU signal.

By taking advantage of this symmetrical property, the base station may perform non-linear superpositioning on the uncoded LSU and HSU constellations, then perform SFBC coding on the superpositioned constellation. The superpositioning of the uncoded constellations may be represented by the following equations:

$$\hat{S}_{k,h} = S_{lsu,k} \oplus S_{hsu,2k}$$

$$\hat{S}_{k,v} = S_{lsu,k+1} \oplus S_{hsu,2k+1}$$

$$\hat{S}_{k+1,h} = S_{lsu,k+1} \oplus S_{hsu,2(k+1)}$$

$$\hat{S}_{k+1,v} = S_{lsu,k} \oplus S_{hsu,2(k+1)+1}$$

where $\hat{S}$ represents the signals of the non-linearly superpositioned constellation prior to TM2 coding. The superpositioned constellation then may be processed by the SFBC encoder in the base station. The result of this encoding on the superpositioned constellation is shown in FIG. 6.

Figure 7:
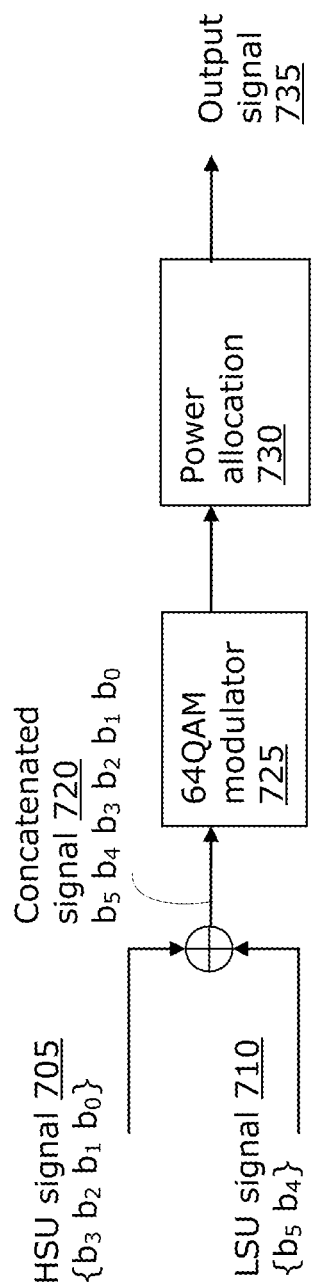
FIG. 7 is a schematic diagram illustrating implementation of non-linear superposition coding on paired signals, in accordance with a disclosed example.

FIG. 7 is a schematic diagram representing the implementation of non-linear superposition coding on the HSU and LSU signals. In this example, the HSU signal 705 has two layers, one of them corresponding to bits b0, b1, b2, b3; while the LSU signal 710 has one layer, corresponding to bits b4, b5. The LSU and HSU signals 705, 710 are concatenated to form a new signal corresponding to the non-linearly superpositioned QAM. The resulting 6-bit concatenated signal 720 is then processed by a 64-QAM modulator 725 at the base station. The modulated signal may then be processed by a power allocator 730 which allocates the transmit power between the two UEs (e.g., using the SOMA processing unit 322 (see FIG. 3) of the base station). After power allocation, in accordance with the SOMA technique, the output signal 735 is the SOMA coded signal (in the non-linearly superpositioned constellation). The SOMA signal may then be coded in accordance with TM2 and transmitted.

The above discussion may be generally applicable to pairing of a spatially multiplexed signal with a non-spatially multiplexed signal, to generate a symmetrical constellation (e.g., for SOMA). In particular, by taking advantage of the symmetrical property of the constellation, it is possible to simply concatenate the spatially multiplexed signal and the non-spatially multiplexed signal to generate a concatenated signal, and then perform transmission processing (e.g., TM2 processing) on the concatenated signal.

A particular challenge in pairing TM2 and TM3 UEs for SOMA is that, in order to combine the HSU signal (which is in processed in accordance with TM3) with the LSU signal (which is processed in accordance with TM2), it is necessary for the HSU signal to have a constellation that can be combined with the TM2 constellation.

Generally, TM3 may be represented by the following equation:

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix}$$

where the x vector is the QAM signal to be transmitted, the y vector is the signal that is actually transmitted (i.e., after TM3 processing), and the matrices W, D, U together form the TM3 processing matrices (which may also be represented as a single TM3 processing matrix). The length of x, v, is the number of layers in the transmission signal, and the length of y, P, is the number of antennas. W is the beamforming matrix, D applies signal rotation (which introduces cyclic delay) and U is a unitary matrix (which serves to mix the signals of different layers). i is the index of the subcarrier.

The challenge is that although x has a constellation, y does not. In order to combine the HSU signal with the LSU signal, as discussed above, it is necessary to maintain the constellation of x, even after applying TM3. In an example of the present disclosure, this may be accomplished by creating an intermediate signal as follows (in this example, for a system with two transmit antennas):

$$\begin{bmatrix} z^{(0)}(i) \\ \vdots \\ z^{(v-1)}(i) \end{bmatrix} = U^{-1}D^{-1}(i)W^{-1}(i) \begin{bmatrix} x^{(0)}(i) \\ \vdots \\ x^{(v-1)}(i) \end{bmatrix}$$

where z is the intermediate signal generated by applying an inverse of the TM3 processing matrices to the QAM signal x. Such an operation is possible because, for transmission of a 2-layer signal, the W, D, and U matrices are all square matrices.

Applying TM3 to the intermediate signal z will then recover the signal x as follows:

$$\begin{bmatrix} x^{(0)}(i) \\ \vdots \\ x^{(v-1)}(i) \end{bmatrix} = W(i)D(i)U \begin{bmatrix} z^{(0)}(i) \\ \vdots \\ z^{(v-1)}(i) \end{bmatrix}$$

Thus, by using an intermediate signal, it is possible to "undo" the TM3 processing matrices and maintain the HSU QAM signal x to be combined with the LSU signal.

Figure 8:
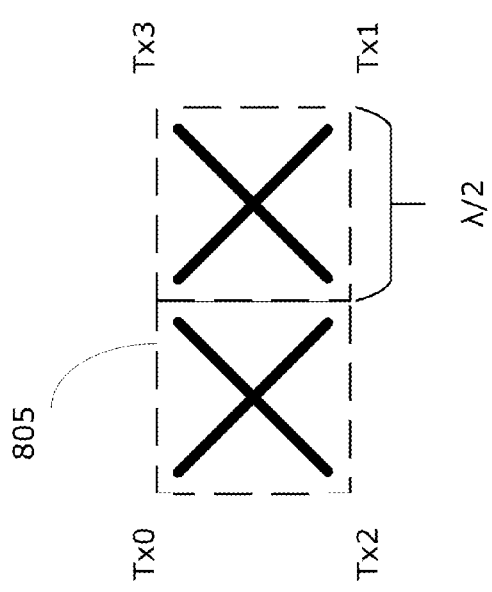
FIG. 8 illustrates TM2 coding applied to a non-linearly superposition coded signal in a four antenna system, in accordance with a disclosed example.

Although the above discussion provided examples in the context of a two-antenna system, this may be similarly implemented for a four-antenna system. FIG. 8 illustrates an example four-antenna configuration 805, and shows a table illustrating an example of TM2 coding (e.g., using Alamouti coding) for the four-antenna system. The above discussions and examples may be adapted for pairing spatial multiplexing and non-spatial multiplexing UEs (e.g., TM2 and TM3 UEs) in the four-antenna system.

Figure 9:
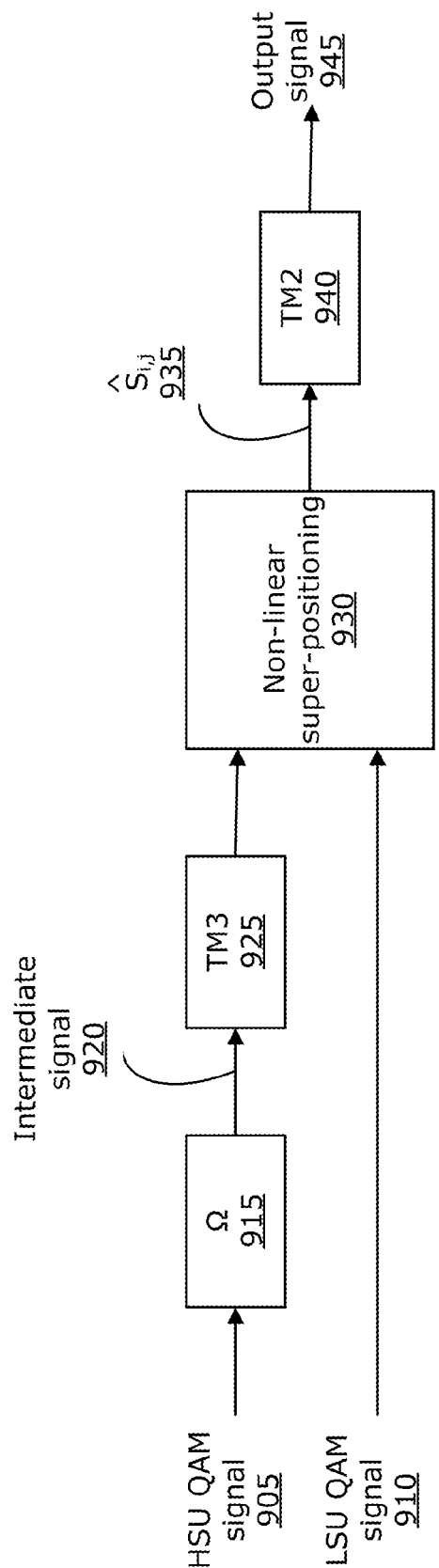
FIG. 9 is a schematic diagram illustrating pairing of TM2 and TM3 UEs for SOMA, in accordance with a disclosed example.

FIG. 9 schematically illustrates the signal processing performed by the base station. This signal processing may be performed by the data processing unit 326 (see FIG. 3) of the base station, for example. Both the HSU modulated signal 905 and the LSU modulated signal 910 are inputs to this process.

At 915, the inverse matrix Ω is applied to the HSU QAM signal 905. Ω may be generally defined as $\Omega = ((W(i)D(i)U)^H (W(i)D(i)U))^{-1} (W(i)D(i)U)^H$, and is the inverse of the TM3 processing matrices. Applying Ω to the HSU signal 905 generates an intermediate signal 920.

At 925 TM3 processing is applied to the intermediate signal 920. Because the intermediate signal 920 is the result of applying the inverse matrix Ω, when the TM3 processing matrices are applied to the intermediate signal 920, the result is that the original HSU signal 905 is recovered.

At 930, non-linear superposition coding is performed on the recovered HSU signal 905 and the LSU signal 910. The inputs are the HSU bits (e.g., bits b0, b1, b2, b3) and the LSU bits (e.g., bits b4,b5). The result is the signal Ŝ 935, which is in the non-linearly superpositioned constellation, where generally $\hat{S}_{i,j} = S_{lsu,i} \oplus S_{hsu,j}$.

At 940, TM2 is applied to the concatenated signal 935. The output signal 945 is the SOMA coded TM2 and TM3 paired signal.

When the output signal 945 is received by the recipient UE, the signal may be decoded in accordance with the non-linearly superpositioned constellation to recover the HSU or LSU signal.

It should be noted that, conventionally, when the transmitted signal is received by a TM3 UE, the TM3 UE would perform the inverse of the TM3 processing to recover the signal. However, since in the example method 900 the TM3 processing was already undone at the base station, the TM3 UE would need to apply the TM3 processing first to the received signal (so that the signal is processed as it conventionally would have been at the base station) and then proceed to undo the TM3 processing as normal. Alternatively, the TM3 UE may simply treat the received signal as a regular spatial multiplexed signal and not a TM3 signal.

When the transmitted signal is received by the TM2 UE, the TM2 UE may treat the received signal as is done conventionally.

Figure 11:
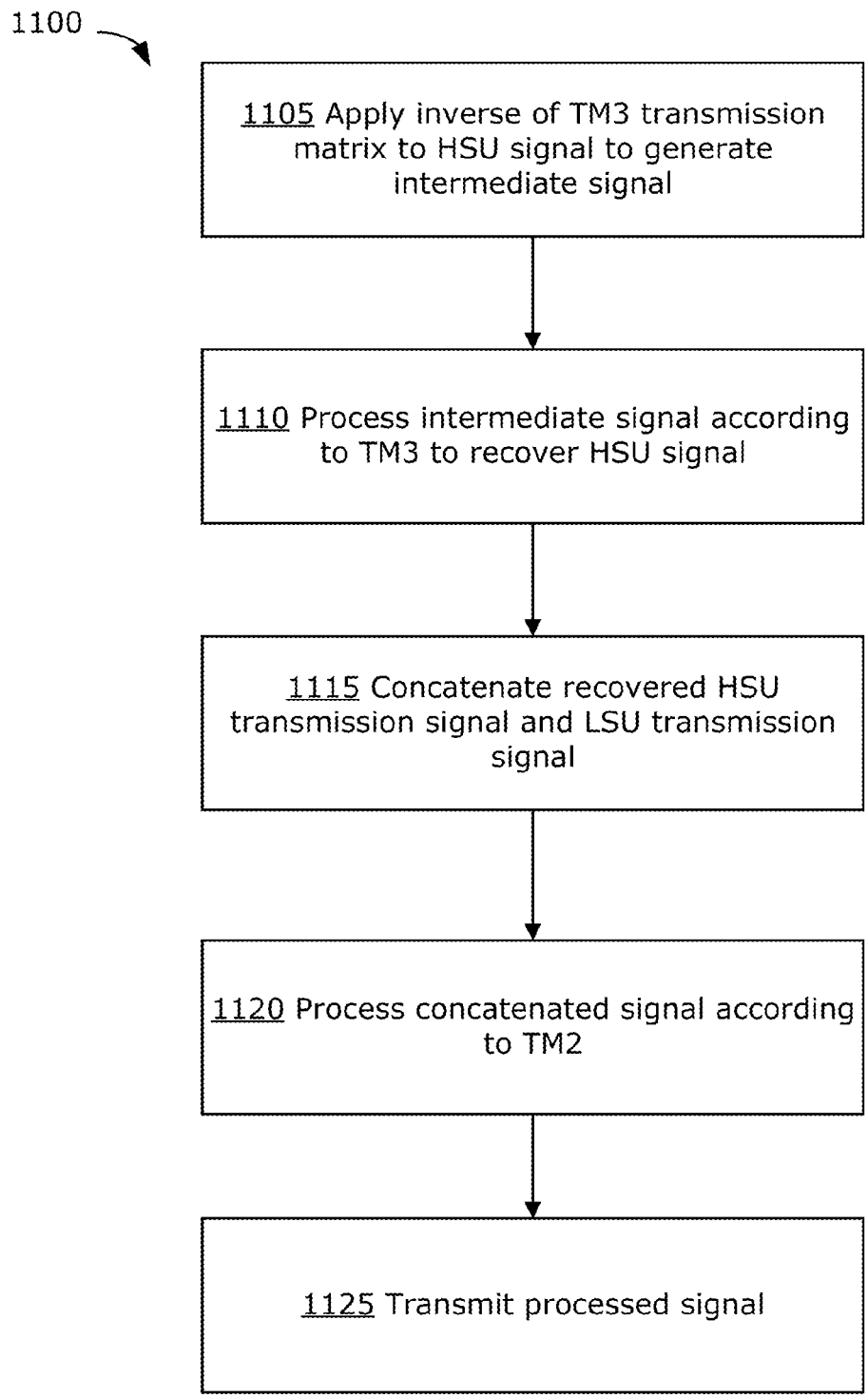
FIG. 11 is a flowchart illustrating an example method for transmitting a signal, in accordance with a disclosed example.

FIG. 11 illustrates the process of FIG. 9 in flowchart form. The example method 1100 may be implemented by the base station. Although the example method is illustrated for the example of pairing TM2 and TM3 UEs, it should be understood that the method 1100 may be adapted for pairing of spatial multiplexing UEs with non-spatial multiplexing UEs in general.

At 1105, an inverse of the TM3 processing matrix(ces) is applied to the HSU modulated signal to be transmitted (e.g., a two-layer QAM signal), to generate the intermediate signal. The inverse matrix may be calculated ahead of time and stored in the base station for use in more than one transmission. In other examples, the inverse matrix may be calculated "on-the-fly" for each transmission.

At 1110, the intermediate signal is processed according to TM3, thus recovering the original HSU signal.

In some examples, such as where the spatial multiplexing signal is not from a TM3 UEs, 1105 and 1110 may be omitted. For example, where the spatial multiplexing signal maintains a constellation after transmission processing or where the spatial multiplexing signal does not undergo transmission processing, it may not be necessary to generate and process an intermediate signal.

At 1115, the recovered HSU signal and the LSU signal (e.g., a one-layer QAM signal) are concatenated together (e.g., by concatenating the bits of the two signals) to generate a concatenated signal in a non-linearly superpositioned QAM constellation, which is suitable for SOMA, in which the portion of the superpositioned constellation corresponding to the HSU signal is symmetrical across each of the real and imaginary axes.

At 1120, the concatenated signal is processed according to TM2, to generate a processed signal. For example, TM2 coding, such as SFBC (e.g., Alamouti code), may be applied to the concatenated signal.

At 1125, the processed signal is transmitted.

The examples discussed with respect to FIG. 9 and FIG. 11 may be generally applicable to both four-antenna and two-antenna systems.

The present disclosure provides certain example algorithms and calculations for implementing examples of the disclosed methods and systems. However, the present disclosure is not bound by any particular algorithm or calculation.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for transmitting a signal, the method comprising:
concatenating a first signal, having one or more first bits, from a first device operating in spatial multiplexing transmission with a second signal, having one or more second bits, from a second device operating without spatial multiplexing transmission to generate a concatenated signal in a non-linearly superpositioned constellation, the concatenated signal comprising the second bits of the second signal followed by the first bits of the first signal, and a portion of the constellation corresponding to the first signal being symmetrical about each of the real and imaginary axes;
processing the concatenated signal according to transmission processing of the second device, to generate a processed signal; and
transmitting the processed signal.

2. The method of claim 1, further comprising:
prior to concatenating, applying an inverse of a transmission processing matrix to the first signal to generate an intermediate signal, the transmission processing matrix representing transmission processing of the first device; and
processing the intermediate signal according to the transmission processing matrix to recover the first signal.

3. The method of claim 1, wherein the first signal is from a device operating in GPP transmission mode 3 (TM3) and the second signal is from a device operating in GPP transmission mode 2 (TM2).

4. The method of claim 1, wherein the first signal is a two-layer QAM signal and the second signal is a one-layer QAM signal.

5. The method of claim 1, wherein the first signal is from a high signal-to-noise ratio (SNR) device and the second signal is from a low SNR device.

6. The method of claim 1, wherein processing the concatenated signal according to the transmission processing of the second device comprises applying a space-frequency block code (SFBC) to the concatenated signal.

7. The method of claim 6, wherein the SFBC is Alamouti code, and wherein the portion of the constellation corresponding to the first signal is unaffected by Alamouti coding.

8. The method of claim 1, wherein the transmission takes place in a two-antenna system.

9. The method of claim 1, wherein the transmission takes place in a four-antenna system.

10. A base station for transmitting a first signal, having one or more first bits, from a first device operating in spatial multiplexing transmission paired with a second signal, having one or more second bits, from a second device operating without spatial multiplexing transmission, the base station comprising:
a processor configured to execute instructions to cause the base station to:
concatenate the first signal with the second signal from the second device to generate a concatenated signal in a non-linearly superpositioned constellation, the concatenated signal comprising the second bits of the second signal followed by the first bits of the first signal, and a portion of the constellation corresponding to the first signal being symmetrical about each of the real and imaginary axes; and
process the concatenated signal according to transmission processing of the second device, to generate a processed signal; and
a transmitter coupled to the processor, the transmitter being configured to transmit the processed signal.

11. The base station of claim 10, wherein the processor is configured to execute instructions to further cause the base station to:
prior to concatenating, apply an inverse of a transmission processing matrix to the first signal to generate an intermediate signal, the transmission processing matrix representing transmission processing of the first device; and
process the intermediate signal according to the transmission processing matrix to recover the first signal.

12. The base station of claim 10, wherein the first signal is from a device operating in 3GPP transmission mode 3 (TM3) and the second signal is from a device operating in 3GPP transmission mode 2 (TM2).

13. The base station of claim 10, wherein the first signal is a two-layer QAM signal and the second signal is a one-layer QAM signal.

14. The base station of claim 10, wherein the first signal is from a high signal-to-noise ratio (SNR) device and the second signal is from a low SNR device.

15. The base station of claim 10, wherein the processor is configured to execute instructions to cause processing of the concatenated signal according to the transmission processing of the second device comprising applying a space-frequency block code (SFBC) to the concatenated signal.

16. The base station of claim 15, wherein the SFBC is Alamouti code, and wherein the portion of the constellation corresponding to the first signal is unaffected by Alamouti coding.

17. The base station of claim 10, wherein the transmitter is configured to cause transmission in a two-antenna system.

18. The base station of claim 10, wherein the transmitter is configured to cause transmission in a four-antenna system.

19. A method for receiving a signal, the method comprising:
receiving a signal encoded in a non-linearly superpositioned constellation, the signal having been encoded from a concatenated signal comprising a first signal, having one or more first bits, that is spatial multiplexed and a second signal, having one or more second bits, that is not spatial multiplexed, the concatenated signal comprising the second bits of the second signal followed by the first bits of the first signal, and a portion of the constellation corresponding to the first signal being symmetrical about each of the real and imaginary axes; and decoding the signal according to the non-linearly superpositioned constellation to produce the first signal.

20. The method of claim 19, further comprising:

prior to decoding the signal, applying a 3GPP transmission mode 3 (TM3) transmission processing matrix to the received signal; and applying an inverse of the 3GPP TM3 transmission processing matrix to the received signal.

21. A device operating in spatial multiplexing transmission, the device comprising:

a processor configured to execute instructions to cause the device to:

receive a signal encoded in a non-linearly superpositioned constellation, the signal having been encoded from a concatenated signal comprising a first signal, having one or more first bits, that is spatial multiplexed and a second signal, having one or more second bits, that is not spatial multiplexed, the concatenated signal comprising the second bits of the second signal followed by the first bits of the first signal, and a portion of the constellation corresponding to the first signal being symmetrical about each of the real and imaginary axes; and decode the signal according to the non-linearly superpositioned constellation to produce the first signal.

22. The device of claim 21, wherein the device is operating in 3GPP transmission mode 3 (TM3), wherein the processor is further configured to execute instructions to further cause the device to:

prior to decoding the signal, apply a 3GPP TM3 transmission processing matrix to the received signal; and apply an inverse of the 3GPP TM3 transmission processing matrix to the received signal.

* * * * *